July 5, 1938. M. W. GERSON 2,123,105
LEAK MENDING DEVICE
Filed Sept. 29, 1936
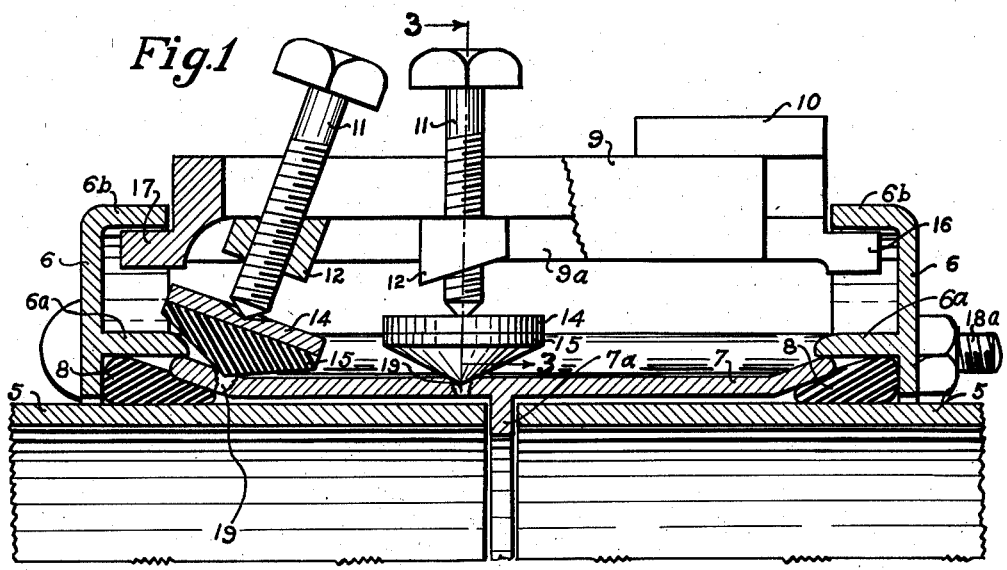
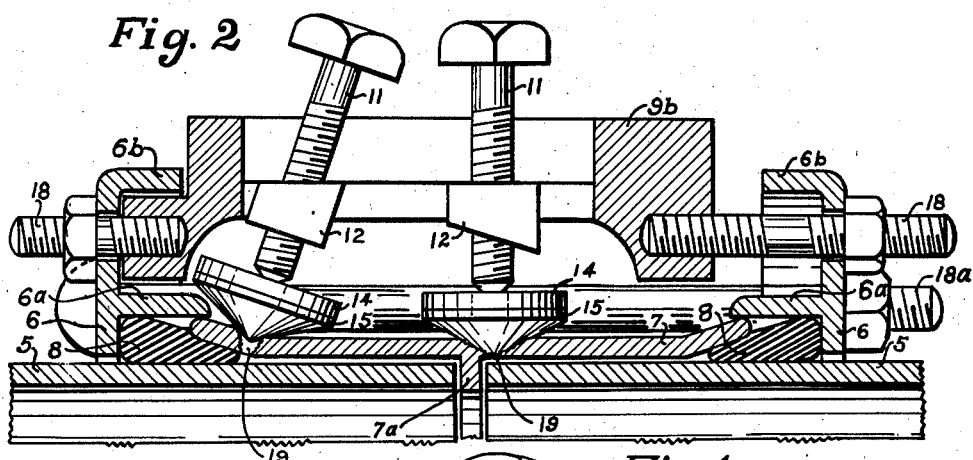
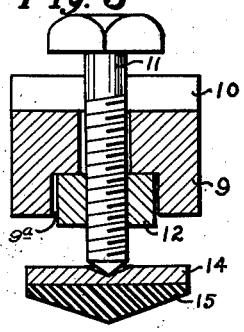
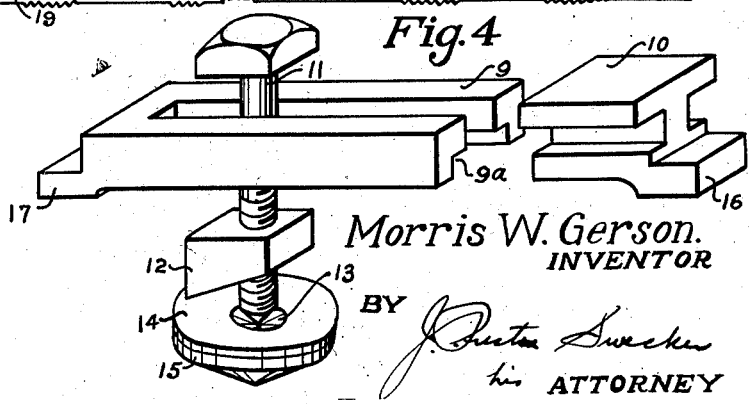
Morris W. Gerson.
INVENTOR
BY
his ATTORNEY Patented July 5, 1938

2,123,105

UNITED STATES PATENT OFFICE 2,123,105

LEAK MENDING DEVICE

Morris W. Gerson, Wichita Falls, Tex.

Application September 29, 1936, Serial No. 103,179

12 Claims. (Cl. 138—99)

This invention appertains to improvements in leak mending devices for pipe lines, and more particularly to the mending of leaks that occur in center rings of pipe couplings which have follower rings and gaskets, the follower rings being held together by bolts.

An object of this invention is to provide a device that may be fitted between the follower rings of a coupling and having a leak-mending gasket affixed over the leak and means for applying direct pressure above the gasket so that it may be held in a fixed position so as to prevent further leakage.

Another object of the invention is to provide a device that may be placed at any angle necessary in order to apply direct pressure at any point on the center ring.

Still another object of this invention is to provide a device that may be adjusted to fit any spacing of the follower rings without impairing its effectiveness.

A still further object of the invention is to provide a device that may be fitted into the bolt holes of the follower rings and serve as a connection therebetween, and at the same time, stop a leak in the center ring directly under the bolt by a leak mending gasket held in position by direct pressure.

While the drawing illustrates a preferred embodiment of the invention and a modification thereof, it is to be understood that in adapting the same to meet specific needs and requirements the design may be varied and changes in the minor details of construction may be resorted to within the scope of the invention as claimed without departing from the spirit thereof.

For a full understanding of the invention and the merits thereof reference is to be had to the following description and the drawing hereto attached, in which:

Figure 1 is a fragmentary longitudinal section, partly in elevation, of a pipe line and coupling, showing the invention installed thereon, parts are broken away to show the construction;

Figure 2 is a fragmentary sectional view of a pipe line and coupling showing a modified form of the invention in section installed thereon;

Figure 3 is a transverse section taken on the line 3—3 of Figure 1, looking in the direction indicated by arrows; and Figure 4 is a perspective view of the preferred form of the invention showing the body and channel members slightly separated.

With more detailed reference to the drawing in which like reference characters designate like parts in the several views, the numeral 5 represents adjacent sections of a pipe line, upon which are mounted and surrounded by follower rings 6. Between the follower rings 6 is mounted a center ring 7, which is adapted to receive a gasket 8 in each opposite end and at the same time engage an annular rim 6a on each follower ring 6. The follower rings are usually held together by longitudinal bolts 18a arranged at intervals around the pipe line to insure a tight joint between the pipe line sections 5, center ring 7 and gaskets or packing 8. However, corrosion is likely to and does occur at various points on the center ring 7, causing leaks which are troublesome to repair.

This invention provides a simple and efficient device by which such a leak can be repaired at any point on the center ring. This device is installed between the follower rings 6 and within outer flanges 6b thereon. Lugs 16 and 17 on body and slidable members 9 and 10, slidably engage with the flanges 6b of the follower rings.

The preferred form of the invention, as shown in Figures 1, 3, and 4, has the body 9 of substantially U-form, with recess or channel 9a formed in the lower portion of the body, in which a slidable channel member 10 interlocks telescopically with body member 9, permitting adjustment of the members 9 and 10 between the follower rings 6 of the coupling, as this space is likely to vary with each joint.

A screw member 11 is usually of pointed construction and extends through the slot of the member 9. A beveled nut 12 is disposed within the recess or channel 9a of the body member 9, this channel 9a being adapted to receive the nut 12 and prevent its turning. The end of the screw, usually pointed, enters a coacting depression 13 in the metal plate 14, which plate is used as a backer for the leak-mending gasket 15 which is used to close or mend a leak as indicated at 19. The leak-mending gasket 15, which may be of lead, rubber or other suitable material, is adapted to be used in connection with plate 14.

The invention is adaptable for repairing leaks at any point or points throughout the entire length of the center ring 7, reversing ends when necessary. The nut 12 has two ends, one beveled and the other flat and by reversing the nut end for end, the angle of the screw 11 may be changed so as to be perpendicular to the beveled ends of the center ring 7, as shown at the left in Fig. 1, or perpendicular to the intermediate portion of said center ring, as also shown in Fig. 1. One or more screws or packings may be used, according to the number of leaks to be repaired.

A modification, as shown in Figure 2, will accommodate leaks that may occur underneath the circumferentially spaced bolts that hold the follower rings 6 together. By using this modification, bolts 18 are placed in the holes normally occupied by the regulation longitudinal bolts, the rings may then be drawn together in the same manner as was previously possible with the regulation bolts, thus acting in the same capacity as the displaced longitudinal bolt, and at the same time the leak mending gasket 15 may be positioned over any leak 19 and secured in place by screw 11 and plate 14 in the manner hereinbefore described. The device shown in Figure 2 may be adjusted longitudinally of the center ring 7 as the body 9b is usually made shorter than the distance between the follower rings 6. It may also be reversed end for end to accommodate leaks at either end of the center ring 7.

The leak mending gasket 15 is ordinarily of conical shape as being best adapted to most needs; however, when necessary, a gasket of any desired shape may be used, for instance, with longer leaks such as splits, it is often desirable to use an oblong gasket and a plate with the same contour as the pipe to be mended, with two or more screw members to be used on the same device to apply the necessary pressure.

It will be understood that the usual fastening bolts are used in connection with the invention to connect the follower ring 6 together, except where one of such fastening bolts is replaced by the bolts of the device.

I claim:

1. In a leak-mending device of the character described, the combination of rings for surrounding a pipe, an elongated device engaging the rings and having an elongated slot extending approximately parallel with the axis of the rings and receiving a screw-member, a nut threaded on the screw member and bearing against the device, and packing means coacting with the inner portion of said screw member.

2. In a leak-mending device of the character described, a body having projected ends adapted to fit into flanged members of follower rings on a pipe coupling, said body having a slot therein receiving a screw member, a nut on the screw member bearing against the body, a plate coacting with said screw member, and a gasket associated with said plate.

3. A leak-mending device of the character described, comprising a slotted body, means at either end of the body for attaching it to flanged follower rings, a screw member disposed within said slotted portion of the body and having a nut associated therewith which has an angular face, a plate and a gasket associated with said screw member.

4. In a leak-mending device of the character described, a slotted body having a projected end, a member slidably engaging said body and having a similar projected end, a screw member and nut disposed within the slotted portion of the body, said screw member having a gasket associated therewith.

5. In a leak-mending device of the character described, a slotted body, threaded members connected with the body and adapted to be connected with follower rings, a screw member disposed within the slotted portion of the body and having a nut coacting therewith, and a plate at the inner end of the screw member and having a gasket associated therewith.

6. A leak-mending device of the character described, comprising a body portion having a longitudinal slot therein, and a member extending through said slot and having leak-packing means at the inner end thereof, said member being adjustable longitudinally of said body portion.

7. A leak-mending device of the character described, comprising a body portion having a longitudinal slot therein, and a member extending through said slot and having leak-packing means at the inner end thereof, said member being adjustable longitudinally of said body portion, and means cooperating between said member and body portion for adjusting said member and packing means relative thereto.

8. A leak-mending device of the character described, comprising a body portion having a longitudinal slot therein, a bolt member extending through said slot and having leak-packing means at the inner end thereof, said member being adjustable longitudinally of the body portion in said slot, and an internally threaded member receiving said bolt member and bearing against the under side of the body member for adjusting said packing means relative thereto.

9. A leak-mending device of the character described, comprising a body portion having a longitudinal slot therein and having a widened channel at the under side of said slot and registering therewith, a nut seated in said channel and slidable longitudinally of the body portion therein, and a screw member extending through the slot and nut and having threaded connection with said nut, said screw member having leak-packing means at the inner end thereof.

10. In a coupling for a pipe line, the combination of follower rings, a center ring interposed between the follower rings, means connecting the follower rings together, and a leak-mending device interposed between and connected with the follower rings, said device comprising a body portion, and a member connected with the body portion and having leak-packing means at the inner end thereof bearing against the peripheral portion of the center ring.

11. In a coupling for a pipe line, the combination of follower rings, a center ring interposed between the follower rings, means connecting the follower rings together, and a leak-mending device interposed between and connected with the follower rings, said device comprising a body portion, and a member connected with the body portion and having leak-packing means at the inner end thereof bearing against the peripheral portion of the center ring, said member being adjustable longitudinally of the body portion and radially of the center ring relative to said body portion.

12. In a leak-mending device of the character described, the combination of follower rings having inturned flanges, an elongated device extending approximately parallel with the axis of the rings and having projected ends in position to engage in the flanged rings, a screw member connected with the elongated device and adjustable longitudinally and radially thereof, and packing means coacting with the inner portion of the screw member.

MORRIS W. GERSON.